United States Patent
Linsley-Hood et al.

(10) Patent No.: US 7,650,522 B2
(45) Date of Patent: Jan. 19, 2010

(54) MOBILITY POLICY MANAGER FOR MOBILE COMPUTING DEVICES

(75) Inventors: Richard Linsley-Hood, Binfield (GB); Anthony D'Agostino, Smithtown, NY (US); Michael Faith, Coram, NY (US); Dean V. La Rosa, Bohemia, NY (US); Eyal Peretz, Stony Brook, NY (US); Gary Still, Plainview, NY (US); Charles Ubriaco, Northport, NY (US); Ronald Zancola, Merrick, NY (US)

(73) Assignee: Symbol Technologies, Inc., Holtsville, NY (US)

(*) Notice: Subject to any disclaimer, the term of this patent is extended or adjusted under 35 U.S.C. 154(b) by 628 days.

(21) Appl. No.: 11/169,093

(22) Filed: Jun. 28, 2005

(65) Prior Publication Data

US 2006/0294582 A1    Dec. 28, 2006

(51) Int. Cl.
*G06F 1/32*   (2006.01)
(52) U.S. Cl. .................. 713/321; 713/323; 709/224; 455/557; 455/574
(58) Field of Classification Search ............... 713/321, 713/323; 370/318; 726/6; 709/224; 455/557, 455/574

See application file for complete search history.

(56) References Cited

U.S. PATENT DOCUMENTS 5,742,833 A * 4/1998 Dea et al. .................... 713/323
7,269,151 B2 * 9/2007 Diener et al. ............... 370/329
2002/0196736 A1   12/2002 Jin
2004/0153676 A1    8/2004 Krantz et al.
2005/0034001 A1    2/2005 Pontarelli
2005/0198257 A1 *  9/2005 Gupta et al. ............... 709/224

OTHER PUBLICATIONS

International Search Report dated Feb. 14, 2007 for PCT Application Serial No. PCT/US2006/23005, 9 Pages.
Yan Yu, et al. Geographical and Energy Aware Routing: a recursive data dissemination protocol for wireless sensor networks. May 2001. http://citeseer.ist.psu.edu/cache/papers/cs/23092http:zSzzSzlecs.cs.ucla.eduzSz-yanyuzSzgeo-draft.pdf/yu01geographical.pdf. pp. 1, 5, and 6.

* cited by examiner

*Primary Examiner*—Thuan N Du

(57) ABSTRACT

A mobile computing device that dynamically and automatically manages all network adapters on the device to obtain the best and most effective balance of network connectivity and power consumption without requiring operator or user application intervention. Performance is increased by lowering power consumption (longer battery life) and decreasing transaction latencies, providing a device that has flexibility and ease of use. According to one aspect is a system that includes a data analysis component that monitors parameters associated with a device and a mobility policy manager component that provides balance of network connectivity and power consumption based at least in part upon the monitored stimuli.

24 Claims, 12 Drawing Sheets

MOBILITY POLICY MANAGER FOR MOBILE COMPUTING DEVICES

TECHNICAL FIELD

The following description relates generally to computer systems, and more specifically to balancing network connectivity and managing power consumption of mobile computing devices.

BACKGROUND OF THE INVENTION

The usage of mobile communication systems utilizing mobile devices has become widespread. Mobile devices such as telephones, pagers, personal digital assistants (PDAs), data terminals, etc. are designed to be carried by those who travel from place to place. Each mobile device is capable of communicating by wireless communication between the mobile device and an access point to which the mobile device is registered. As the mobile device roams from one cell or geographic region to another, the mobile device will typically deregister with the access point of the previous cell and register with the access point associated with the new cell.

In general, when one network component transmits a signal to another network component, the transmitting network component typically expects a response from the receiving network component within a reasonable time frame. If a response is not received within the reasonable time (e.g., lapsed time-out), communication usually terminates. In order to respond to such transmissions in a timely manner, many devices continuously operate in a high power (e.g., full power) mode such that a device can continuously, periodically and/or on demand, monitor, receive and respond to incoming transmissions.

Current industry trend, however, is to minimize power consumption. Common techniques that mitigate power consumption include automatic power management utilities that transition a device to a lower power or "off" state. For example, many devices utilize standard power management technologies, such as Advanced Configuration and Power Interface (ACPI), which enable system software/firmware (e.g., operating system or application) to control power by automatically transitioning the device to a low power state (e.g., Standby, Suspend, Hibernate, Sleep, Deep Sleep . . . ) when full power is not required. Typically, when the device transitions to the lower power state, network connections are terminated and power is removed from the CPU, volatile memory, transceivers, etc. The foregoing can conserve power consumption and battery life, however, the device essentially is inoperable to communicate with the outside world until it transitions back to a higher power state.

Mobile computing devices lack the ability to configure and/or automatically and dynamically manage power consumption of multiple network adapters and cost of, or options for, use of network connectivity. This places a burden upon a user to either statically predict and set or manually configure the nominal operating mode periodically. This does not facilitate flexibility and/or adaptability during operation of the device. Therefore, what is needed is an optimum power-connectivity trade-off that can be continuously obtained and updated automatically and/or dynamically on a device.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The invention disclosed and claimed herein, in one aspect thereof, comprises a portable and/or mobile communication device that includes a data analysis component and a mobility policy manager component. The data analysis component monitors stimuli associated with a device. The stimuli can be at least one of network traffic, an internet protocol address, and a port number. The mobility policy manager (MPM) component provides balancing of network connectivity and power consumption based at least in part upon the monitored stimuli. The MPM component can include a policy module that determines a policy based at least in part on the monitored stimuli. The MPM component can include an alter module that alters at least one policy to provide an optimal device power consumption. Further included in the MPM component is a tolerance parameter module that ensures the policy remains within a predetermined power consumption range and/or a hysteresis module that prevents excessive altering between multiple device states. According to a further aspect, the MPM component can include a persistence module that allows the device to remain in a non-optimal state during a communication. Also included can be a route module that hinders traffic in the absence of an appropriate route. The route module can include a firewall module that restricts traffic if an appropriate route is not available.

Still another aspect is a communication architecture including a network that includes a plurality of resources, a data analysis component that captures data about the plurality of resources, and a mobility policy manager (MPM) component. The MPM component can determine a policy to obtain efficient network connectivity and power consumption based at least in part on the captured data. The captured data includes at least one statistic based on network traffic associated with an Internet Protocol address or a port number end point. The MPM component can dynamically alter a predefined policy based at least in part upon the captured data.

According to a further aspect is a method for dynamically managing network connection performance. The method includes creating an initial policy, monitoring the initial policy, and automatically altering the initial policy to achieve at least one policy objective. The initial policy is created based upon at least one statistic derived from device conditions. Automatically altering the initial policy includes determining a state of a connection, ascertaining if the connection is complete, and maintaining the connection state until communication is complete.

Yet another aspect is a computer readable medium of a portable and/or mobile device to efficiently manage network connections. The computer readable medium includes a data analysis component operable to monitor device conditions and a mobility policy manager component that dynamically alters a policy to achieve at least one policy objective. The mobility policy manager provides balance of network connectivity and power consumption based at least in part on the monitored device conditions.

The following description and the annexed drawings set forth in detail certain illustrative aspects of the invention. These aspects are indicative, however, of but a few of the various ways in which the principles of the invention may be employed and the invention is intended to include all such aspects and their equivalents. Other advantages and novel features of the invention will become apparent from the fol-

DESCRIPTION OF THE INVENTION

Figure 1:
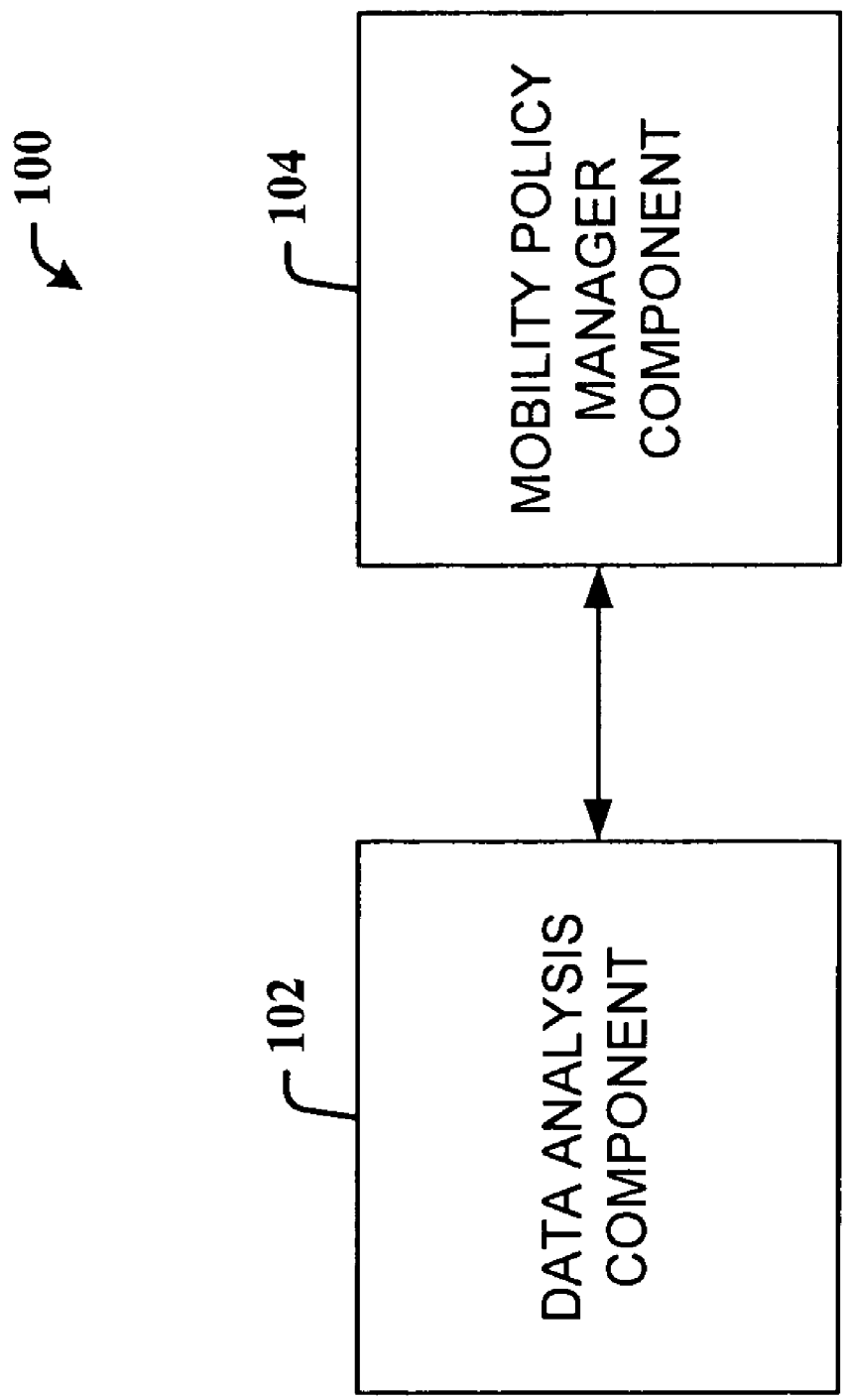
FIG. 1 illustrates a system for managing network connectivity and power consumption.

The subject invention is now described with reference to the drawings, wherein like reference numerals are used to refer to like elements throughout. In the following description, for purposes of explanation, numerous specific details are set forth in order to provide a thorough understanding of the invention. It may be evident, however, that the invention may be practiced without these specific details. In other instances, well-known structures and devices are shown in block diagram form in order to facilitate describing the invention.

As used in this application, the terms "component," "module" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the invention may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Artificial intelligence based systems (e.g., explicitly and/or implicitly trained classifiers) can be employed in connection with performing inference and/or probabilistic determinations and/or statistical-based determinations as in accordance with one or more aspects of the subject invention as described hereinafter. As used herein, the terms "infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Referring initially to FIG. 1, illustrated is a system 100 for managing network connectivity and power consumption. The system 100 can be implemented on any mobile device, such as a personal digital assistant (PDA), a mobile phone, a smart phone, a palm pilot, a personal data assistant, a mobile computer, a scanner, an RFID (radio-frequency identification) device, a laptop (or desktop) computer, a wearable computer device or any other mobile computing device.

The system 100 includes a data analysis component 102 that interfaces with a mobility policy manager component 104. The data analysis component 102 is adapted to receive, obtain, monitor, record, etc. stimuli and/or data (both internal and external to the device) that relates to connectivity and power consumption of the device. The data analysis component 102 is further adapted to analyze and evaluate such data and can provide statistics generated from such data. For example, the data analysis component 102 can obtain information relating to network traffic to and/or from an Internet Protocol address and/or port number end points or end point pairs. Port numbers allow different applications on the same device to utilize network resources without interfering with each other. The data analysis component 102 can further monitor power consumption to ensure that, through a policy, the power consumption remains within a predetermined range.

The data analysis component 102 interfaces with the mobility policy manager component 104 to allow a mobile computing device to dynamically and automatically manage all wide-area network (WAN), local-area network (LAN), personal area network (PAN), cradle, modem or other network adapters on a device. This facilitates an efficient and optimum balance of network connectivity and power consumption. In such a way, operator and/or user application interaction is mitigated after initial device configuration.

The mobility policy manager 104 receives the analyzed data from the data analysis component 102, such as in the form of statistics. The statistics are utilized to either create a predetermined fixed policy and/or to allow the mobility policy manager 104 to automatically evaluate the cost versus the performance requirements of the system to create and/or dynamically alter and maintain any such policy. The policy or set of policies are generated for use on the portable and/or mobile communication device and identify what actions should and/or should not be taken for a given set of stimuli. The policy, written in software, can be generated for use in a particular mobile communication environment. The policy can treat physical network adapters that allow multiple power settings internally as multiple separate logical adapters.

Figure 2:
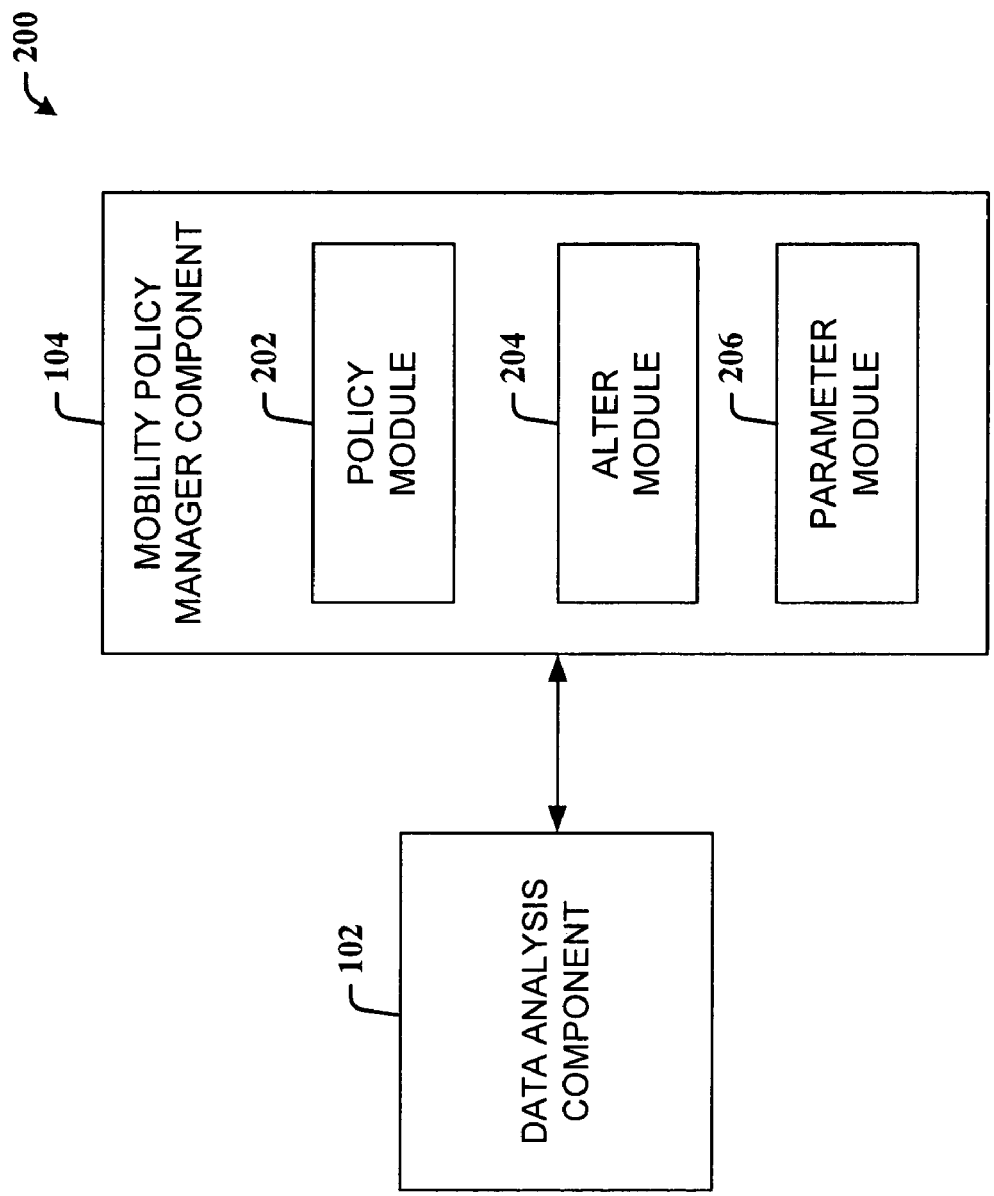
FIG. 2 illustrates exemplary modules associated with a system that facilitates managing power consumption and network connectivity.

With reference now to FIG. 2, illustrated are modules associated with a system 200 that facilitates managing power consumption and network connectivity of a mobile computing device. The modules illustrated are exemplary and it is to be understood that more or less modules can be utilized and fall within the scope of the specification and appended claims. The mobility policy manager component 104 can include a policy module 202, an alter module 204 and/or a parameter module 206 that interface with each other and with the external data analysis component 102.

The policy module 202 can receive information, such as from the external data analysis component 102 and, based upon derived statistics, determine a policy to achieve an optimal balance of network connectivity and power consumption. The statistics can be collected ahead of time to allow for creating an initial policy. Thus, the policy can be predetermined and fixed, allowing no changes or alterations to such policy. Alternatively or in addition, the policy can be dynamic allowing the device to automatically evaluate the cost versus performance requirements of the device. The policy can be created and/or dynamically altered to maintain a policy that facilitates network connectivity and reduces power consumption.

An alter module 204 allows the policy to be dynamically updated based upon changing conditions (both internal and external) as received from the data analysis component 102. The alter module 204 utilizes the statistics, for example, and may limit or force particular modifications to a policy depending on the situation, such as allowing minimum and maximum outcomes to be predetermined through an interface with a parameter module 206. Thus, the policy can be dynamically altered to ensure that the policy is within an expected range or set of circumstances that provide the device with optimum connectivity and reduced power consumption.

Figure 3:
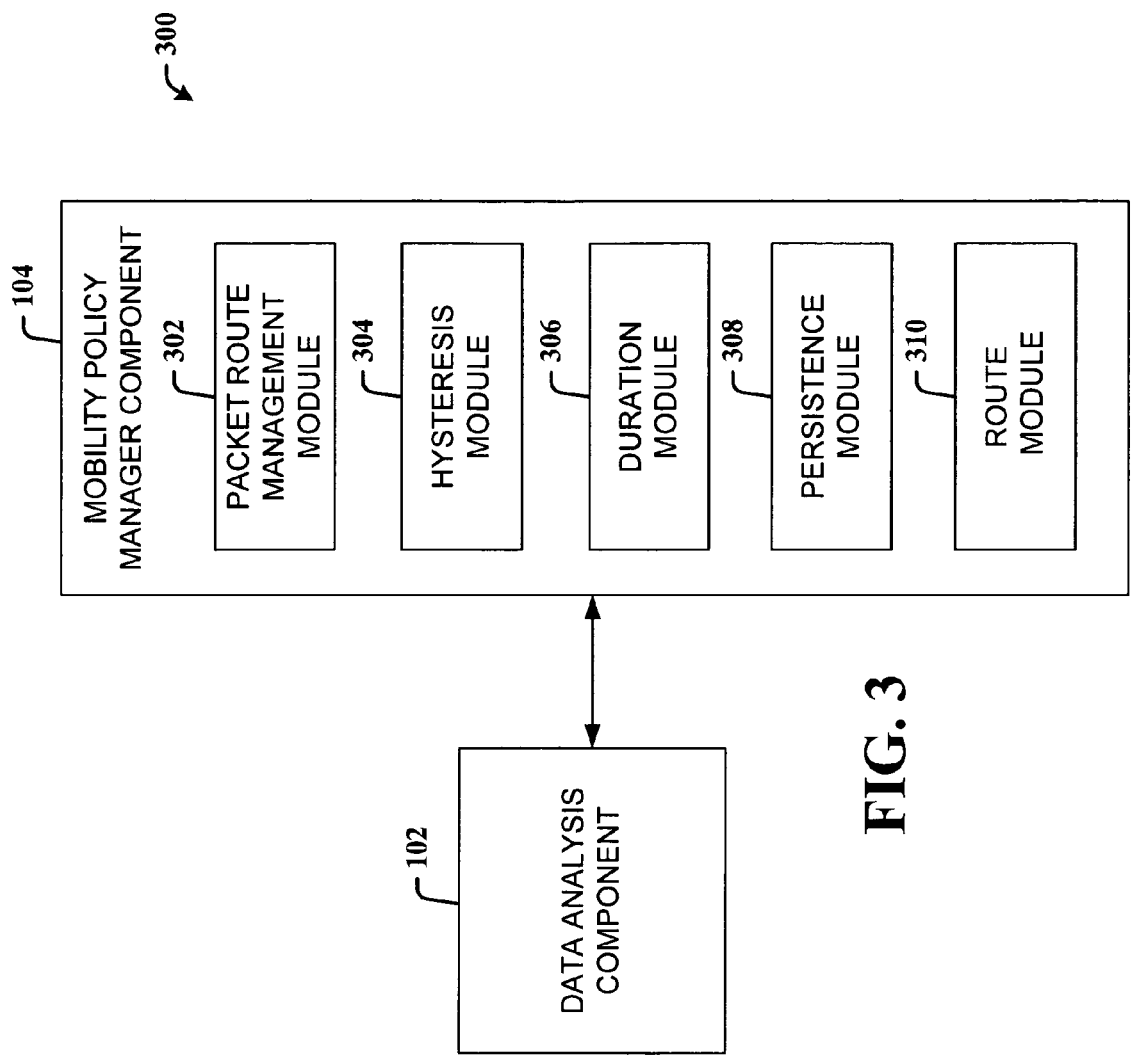
FIG. 3 illustrates exemplary modules associated with a system that facilitates managing power consumption and network connectivity.

FIG. 3 illustrates exemplary modules associated with a system 300 that facilitates managing power consumption and network connectivity. The exemplary modules illustrated can be utilized in conjunction with the one or more modules discussed with reference to FIG. 2 or they can be utilized separately. Included are a packet route management module 302, hysteresis module 304, duration module 306, persistence module 308, and/or route module 310. The mobility policy manager component 104 utilizes various parameters of a device to ensure that power consumption is reduced while allowing optimum network connectivity and device functionality. The mobility policy manager component 104 can specify an initial policy to establish and/or maintain the connectivity and/or functionality objectives and further can dynamically and/or autonomously update, modify, etc. the policy to ensure the objectives are met. This can be accomplished through the one or more modules associated with the system 300.

The packet route management module 302 is adapted to allow more than one network adapter associated with a device to be powered or active at any given time, such as a substantially similar time. In such a situation, the packet route management module 302 can analyze the various network adapters and routes and alter a policy to control the connectivity of the device. For example, each network adapter may be analyzed separately or concurrently with the other adapters to determine needed policy changes, if any, to ensure that each network adapter has optimum connectivity. The packet route management module 302 can be further adapted to stop a connection, either permanently or temporarily, if a particular connection is interfering with one or more other connections, or if a particular connection is experiencing problems, such as too much traffic on the network, slow network performance, unresponsive network connections, etc.

Another module associated with the mobility policy manager component 104 is a hysteresis module 304 that analyzes one or more network connections and determines the state of each connection. For example, the state of a network connection can be described as various levels of power consumption. These levels can include "off," "listening for network availability," "connected to a network," "receiving data", "transmitting data," etc. It is to be understood that each of these levels can include additional levels relating to, for example, the geographic distance between the terminal and an infrastructure transmitter depending on the network type. The levels can also be described as being hierarchically ordered, for example, from the least power consumption ("off") to the highest power consumption ("transmitting data"). The hysteresis module 304 is further adapted to prevent inefficient, continuous alternating between multiple states and may force the device into a particular state to improve device efficiency.

The duration module 306 is adapted to measure, obtain, determine, etc. the time interval/range spent at each of the power levels for any given connection. The time interval/range can include the amount of time taken to get to a particular state and the dwell time to transition out of such state. The time interval/range can also be measured as including the time spent in a particular state. Thus, the duration module 306 can construct a "total duty cycle" of power consumption for a given connection based on the time spent at a given power level and the power used at that level. This can be incorporated into the profile and/or statistic(s) where appropriate and any subsequent attempt to connect can be matched against such existing profile(s) to determine the most power effective manner to complete that connection. It should be understood that the measurement does not have to be "time" provided there is a measurement means that can determine the range in which a given connection is at a particular power level.

The hysteresis module 304 and the duration module 306 provide the mobility policy manager component 104 information to determine whether to switch to the next lower power usage adapter and/or whether to switch to a higher power usage adapter. The capacity to determine if it is valid to transition from a lower power state to the next higher one, or vice versa, is part of the consideration of the overall switching characteristics of the mobility policy manager component 104. The decision to switch to a next lower (or higher) power usage adapter can be determined by leaving it in a particular state and determining its availability at that level before, moving it to a lower (or higher) state. A higher power usage adapter can then be transitioned to a lower power consumption state possible after some dwell time to allow for a degree of hysteresis.

A persistence module 308 is adapted to monitor one or more network connections and can work separately or in conjunction with the hysteresis module 304. The persistence module 308 can monitor the one or more network connections. If a particular connection is not complete (e.g., data, information, messages, text is still being transferred to/from the device) the persistence module 308 can force the device to remain in a particular state for the duration of that particular connection. For example, it may be determined that the state of a particular connection is non-optimal. By non-optimal it is meant that the connection is inefficient, consumes excessive resources, is not the best configuration, etc. The persistence module 308 analyzes the connection and can determine that, although in a non-optimal state, the particular state should be maintained for the duration of that particular connection or connections. This allows for the correct completion of that particular communication. After the communication is complete, the persistence module 308 can allow the device to switch to a more optimal state.

Figure 4:
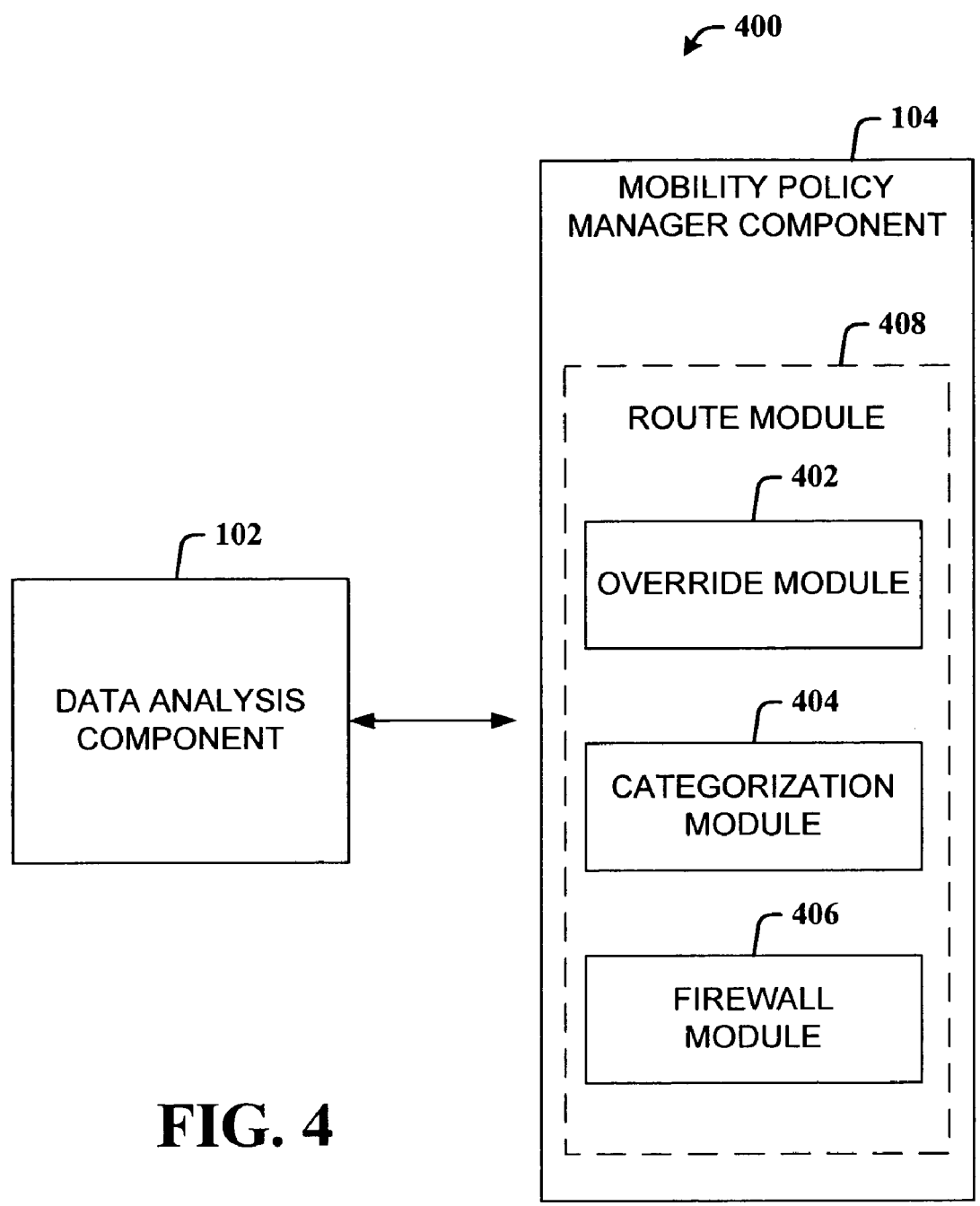
FIG. 4 illustrates modules associated with a system that facilitates managing power consumption and network connectivity.

A route module 310 is provided that can determine a network connection route, alter an existing route, force a particular route, and/or block or reject traffic if no appropriate route is available. Exemplary modules associated with the route module 310 are illustrated in FIG. 4 and can include an override module 402, a categorization module 404, and/or a firewall module 406. The exemplary modules 402-406 interface with each other and the other modules of the mobility policy manager 104 to provide systems and/or methods that balance network connectivity and manage power consumption of mobile devices.

The override module 402 provides input to the mobility policy manager 104 to alter the policy to allow for designated connections based upon one or more policy goal(s) and/or objective(s). The designated connections can be determined based upon statistics relating to such network connections. A determination can be made to designate a particular route or outcome by overriding other choices as determined by analysis of the statistics and/or policy. The override module 402 facilitates forcing the particular outcome or route though utilization of the designated connections. For example, if there is more than one adapter on a device, each having a different degree of power consumption, the mobility policy manager component 104 is adapted to determine which adapter to utilize and can transition between the adapters, depending on the requirements of a particular connection. For example, if it is desired to download a large amount of data onto a device, the mobility policy manager component 104 can determine that speed is more important than power conservation (since more power generally equals more speed). In such a situation, the device will transition to the highest power/speed adapter, regardless of any policy power conservation requirements and/or objectives.

The connections can also be categorized though utilization of a categorization module 404. Such a categorization can analyze the requirements of creating a new route and/or maintaining an existing route. The categorization module 404 can prefer one requirement over the other. For example, the categorization module 404 can treat the requirements for creating a new route differently than the requirements of utilizing an existing route. In some situations, a new route can be preferred, while in other situations the existing route may be preferred. The categorization module 404 is adapted to analyze the requirements of both in relation to the policy goals, objectives, statistic information, and/or information obtained from other modules of the mobility policy component 104 and/or data analysis component 102.

There are some circumstances in which particular traffic may be blocked and/or rejected though utilization of a firewall module 406. If a determination is made that no appropriate route for a network connection exists, such a connection may be refused and/or hindered and connectivity not allowed. In this situation, the connection will need to be made or attempted at a different time when an appropriate route is available.

Figure 5:
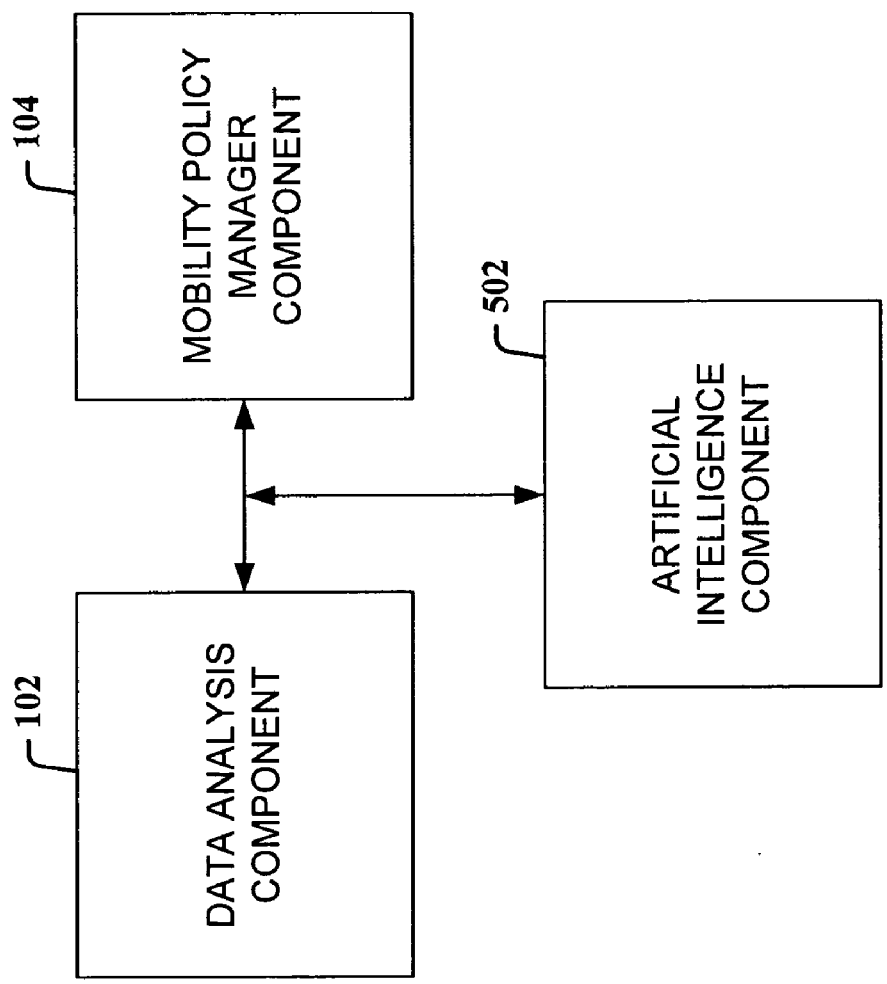
FIG. 5 illustrates a system for managing power consumption utilizing an artificial intelligence component.

FIG. 5 illustrates a system 500 for managing power consumption that employs artificial intelligence (AI) which facilitates automating one or more features in accordance with the subject invention. The AI can be effected via AI component 502, as illustrated, that interfaces with an external data analysis component 102 and a mobility policy manager component 104.

The subject invention (e.g., in connection with managing power consumption) can employ various AI-based schemes for carrying out various aspects thereof. For example, a process for determining the best and most effective balance of network connectivity and power consumption can be facilitated via an automatic classifier system and process. Moreover, where network adapters are employed having the same or similar resources, the classifier can be employed to determine which network adapter to employ in a particular situation.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to grant access, which stored procedure to execute, which policy objective/goal to conform to or override, etc. The criteria can include, but is not limited to, the amount of data or resources to accessed via a call, the type of data, the importance of the data, etc.

Figure 6:
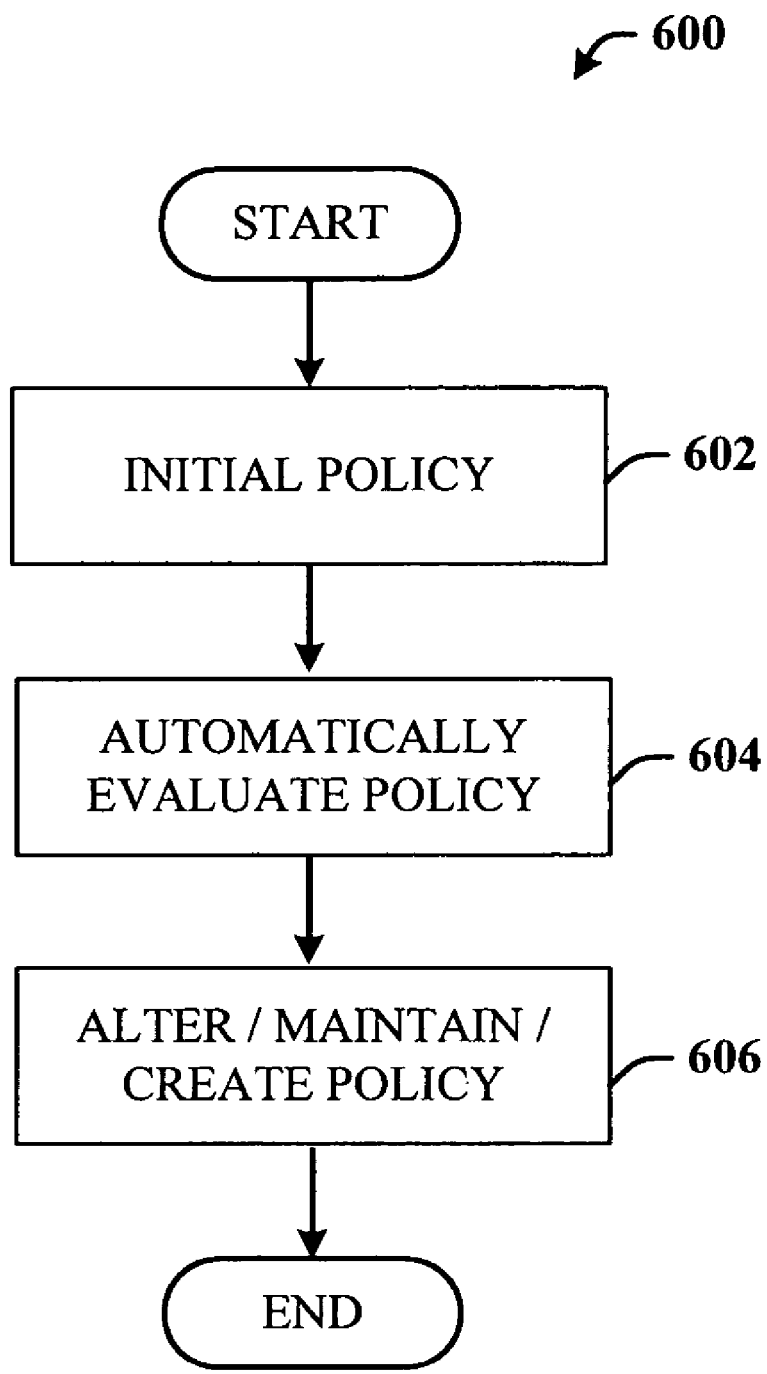
FIG. 6 illustrates a flow chart of a methodology for optimal network connectivity and minimum power consumption utilizing one or more policies based on external and/or internal device conditions.
Figure 7:
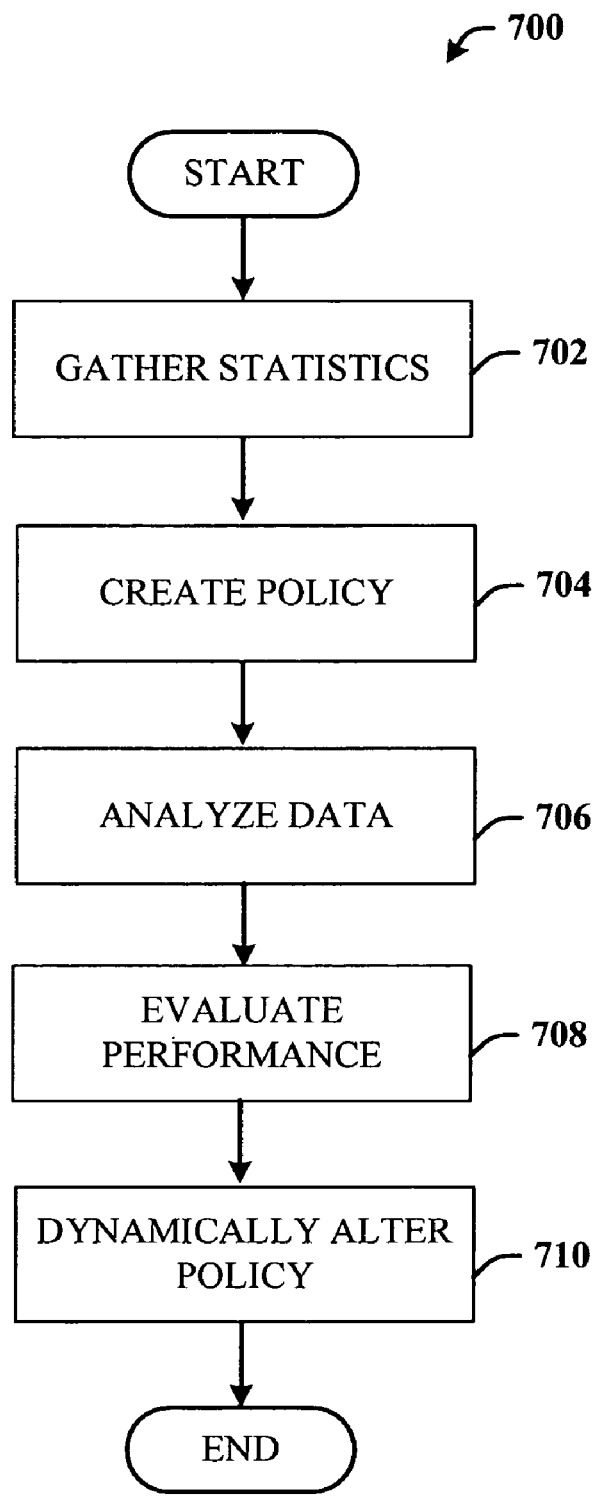
FIG. 7 illustrates a flow chart of a methodology for dynamically and automatically managing power consumption and enhancing network connectivity
Figure 8:
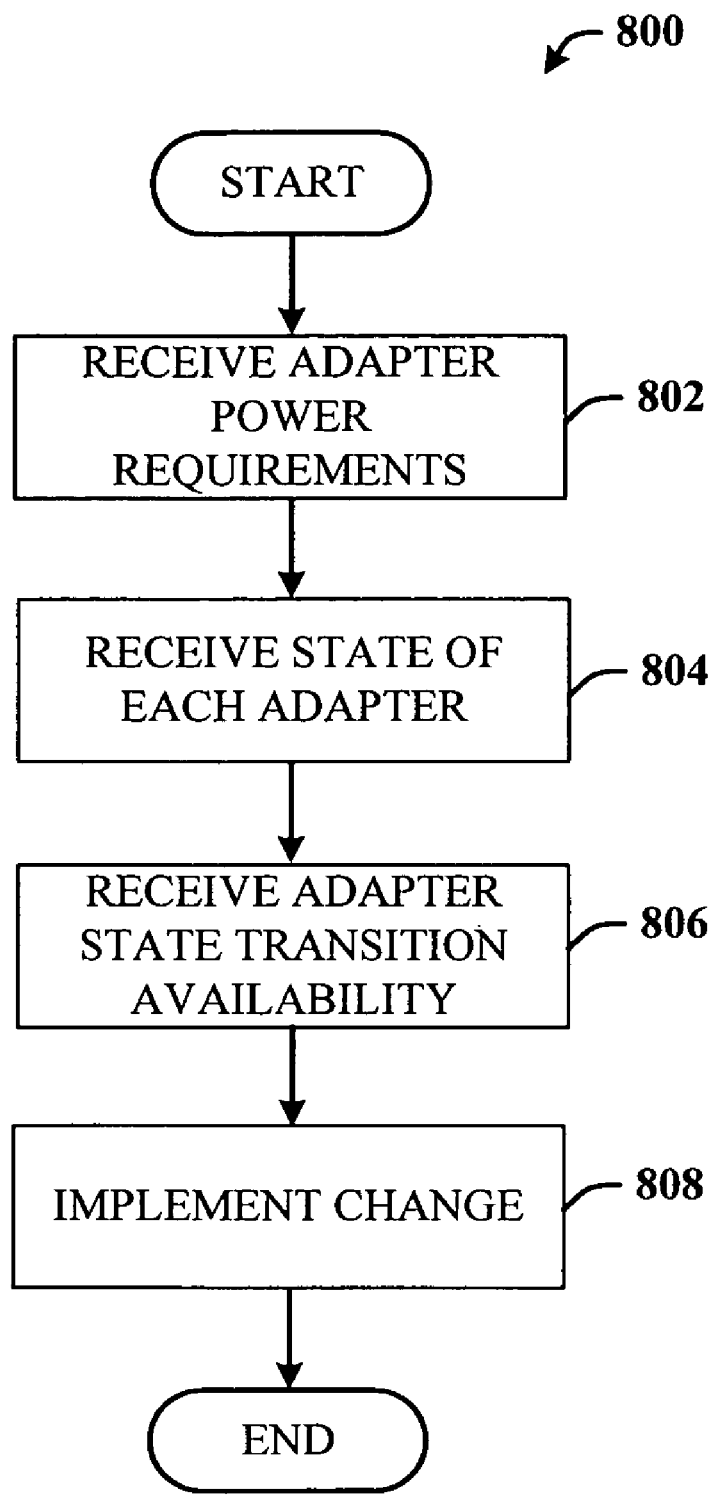
FIG. 8 illustrates a flow chart of a methodology for determining transition of power states between a plurality of adapters.

In view of the exemplary systems shown and described above, methodologies, which may be implemented in accordance with one or more aspects of the invention, will be better appreciated with reference to the diagram of FIGS. 6, 7, and 8. The systems and/or methodologies automatically and dynamically increase performance of a device while lowering power consumption (longer battery life) and decreasing transaction latencies, providing ease-of-use and device flexibility. While, for purposes of simplicity of explanation, the methodologies are shown and described as a series of function blocks, it is to be understood and appreciated that the invention is not limited by the order of the blocks, as some blocks may, in accordance with the invention, occur in different orders and/or concurrently with other blocks from that shown and described herein. Moreover, not all illustrated blocks may be required to implement a methodology in accordance with one or more aspects of the invention. It is to be appreciated that the various blocks may be implemented via software, hardware, a combination thereof or any other suitable means (e.g. device, system, process, component) for carrying out the functionality associated with the blocks. It is also to be appreciated that the blocks are merely to illustrate certain aspects of the invention in a simplified form and that these aspects may be illustrated via a lesser and/or greater number of blocks.

FIG. 6 illustrates a flow chart of a methodology 600 for optimal network connectivity and minimum power consumption utilizing one or more policy based on external and/or internal device conditions. The method starts, at 602, where a policy is determined. The policy can be a fixed policy or a configurable policy and can be based on statistics derived prior to the policy being implemented. The statistics can be derived from network traffic to and/or from an Internet Protocol address and/or port number end points or end point pairs. The statistics can alternatively or in addition be derived from other stimuli, information, data, etc. derived from both an internal and/or an external environment of the device. For example, the stimuli can be information derived from a plurality of resources in a communication architecture. The plurality of resources can be other devices, data being communicated, network adapters, etc.

The statistics can be monitored and/or automatically evaluated, at 604, such that the policy can be altered to allow minimum and maximum outcomes to be pre-determined. The policy can be evaluated to ensure that the connectivity of a particular connection is at an optimal level, and if not at an optimal level to determine if the connection should be maintained based on other factors, such as a continuing communication. An objective of the policy can be to automatically evaluate the cost versus the performance requirements to create and/or dynamically alter and maintain any such policy.

At 606, the policy is altered, maintained, created, etc. based upon the evaluation performed. For example, the policy can be altered to control the connectivity of the device, maintain the current device connectivity, etc. The policy can be modified to determine a particular network connection route, alter an existing route, force a particular route, and/or block or reject traffic if no appropriate route is available.

Referring now to FIG. 7, illustrated is a flow chart of a methodology 700 for dynamically and automatically managing power consumption of multiple network adapters and cost of, or options for, use of network connectivity. The method starts, at 702, where external and/or internal stimuli are gathered and, based on such stimuli, statistics are created. The statistics can relate to connectivity and/or power consumption of a mobile computing device. For example, the data can be related to network traffic to and/or from an Internet Protocol address and/or port number end points or end point pairs. The network traffic data can be utilized to derive statistics regarding network connectivity and the optimal connections, routes, options, etc. to both achieve efficient network communication and reduce costs associated with operating and maintaining a mobile computing device.

A policy is created based upon the derived statistics, at 704. The policy can be a fixed policy that does not allow changes or an adaptable policy that allows automatic evaluation of cost versus performance requirements. An automatic evaluation allows dynamic creation, alteration, maintenance, etc. of the policy to ensure that network connectivity and power consumption is at optimum levels.

Data relating to the operation, connectivity, power consumption, etc. of a mobile device is periodically and/or constantly analyzed, at 706, to ensure the objectives established by the one or more policies is being met. The performance of the device and its network connectivity is evaluated, at 708, based upon the analyzed data. The policy can be altered, at 710, if necessary to conform to the policy requirements. For example, the policy can be altered to allow for persistence of a non-optimal state for the duration of a particular connection or connections to allow for the correct completion of communication. The policy can allow for appropriate hysteresis to prevent inefficient or continuous alternating between multiple states that would otherwise result in inefficient communication. The policy can allow designated connections that override other choices to force a particular outcome or route. The policy can treat physical network adapters that allow multiple power settings internally as multiple separate logical adapters. The policy can be modified or adapted to establish and achieve objective relating to device connectivity and reduced power consumption. The policy can further be utilized to perform other functions relating to conserving power while maintaining optimum network connectivity and data transfer.

With reference now to FIG. 8, illustrated is a flow chart of a methodology 800 for determining transition of power states between a plurality of radio or network adapters. For illustration purposes, the methodology will be discussed with reference to three network adapters ("A," "B," and "C"). It is to be understood that this methodology can be applied to two or more network adapters and is not to be limited by the following detailed description.

The method starts, at 802, with receipt of network adapter power requirements. The power requirements of each adapter can be ranked from the adapter with the highest power usage ("A") to the adapter with the lowest power usage ("C"). Methods of distinguishing between the states of each adapter other than a ranking can be utilized. It is also to be understood that adapters may have similar power usages and can be classified together.

At 804, the state of each adapter is received. The state can refer to the power level consumption and can be categorized in ranges consisting of an hierarchical order, such as 1 being the lowest power consumption and 5 being the highest power consumption. For example, the states can be "off"=1; "listening for network availability"=2; "connected to a network"=3; "receiving data"=4; and "transmitting data"=5. It is to be understood that more or less power level consumption states can be utilized as well as each level having additional levels included therein. For example, the additional levels can relate to the geographic distance between the terminal and the infrastructure transmitter depending on the network type.

The method continues, at 806, where the availability of a particular adapter to transition to a lower or higher state is received. With continuing reference to the example above, adapter "A" consumes the most power and adapter "C" the least power. Thus, it would be advantageous to keep adapter "A" at the lowest power consumption state possible and adapter "C" in the highest power consumption state, if required. For example, the adapters can have the following initial state: adapter "A"=1 (off); adapter "B"=3 (connected to a network); and adapter "C"=2 (listening for network availability). If adapter "C" indicates that it is capable of transiting to state 3, then the option to switch the state of adapter "C" becomes valid and adapter "C" can change states with an adapter with a higher power consumption rate. Adapter "A", having the highest power consumption, would change to state 3 only if the adapter(s) having the lower power consumption (adapters "B" and "C" in this illustration) indicate it is no longer in coverage and is now unusable.

At 808, the adapters are changed to the appropriate state to comply with optimal power consumption and network connectivity as determined by policy goals and/or objective. For example, when adapter "C" transitions to state 3, adapter "B" can, in turn, transition to a lower state, such as state 1 or 2. By way of example, the initial states of the adapters could be "A" is in state 3; adapter "B" is in state 2; and adapter "C" is in state 1. Thus, the method would determine that the adapter with the highest power consumption ("A") is in the highest power state (3) and thus, if adapter "B" and/or adapter "C" is available, such adapter should transition to state 3 and adapter "A" transition to state 2 or lower. In this situation, the ideal transition would be for adapter "A" to transition to state 1 and adapter "C" to transition to state 3. However, policy objectives and/or goals might not allow such minimum levels of power consumption.

Figure 9:
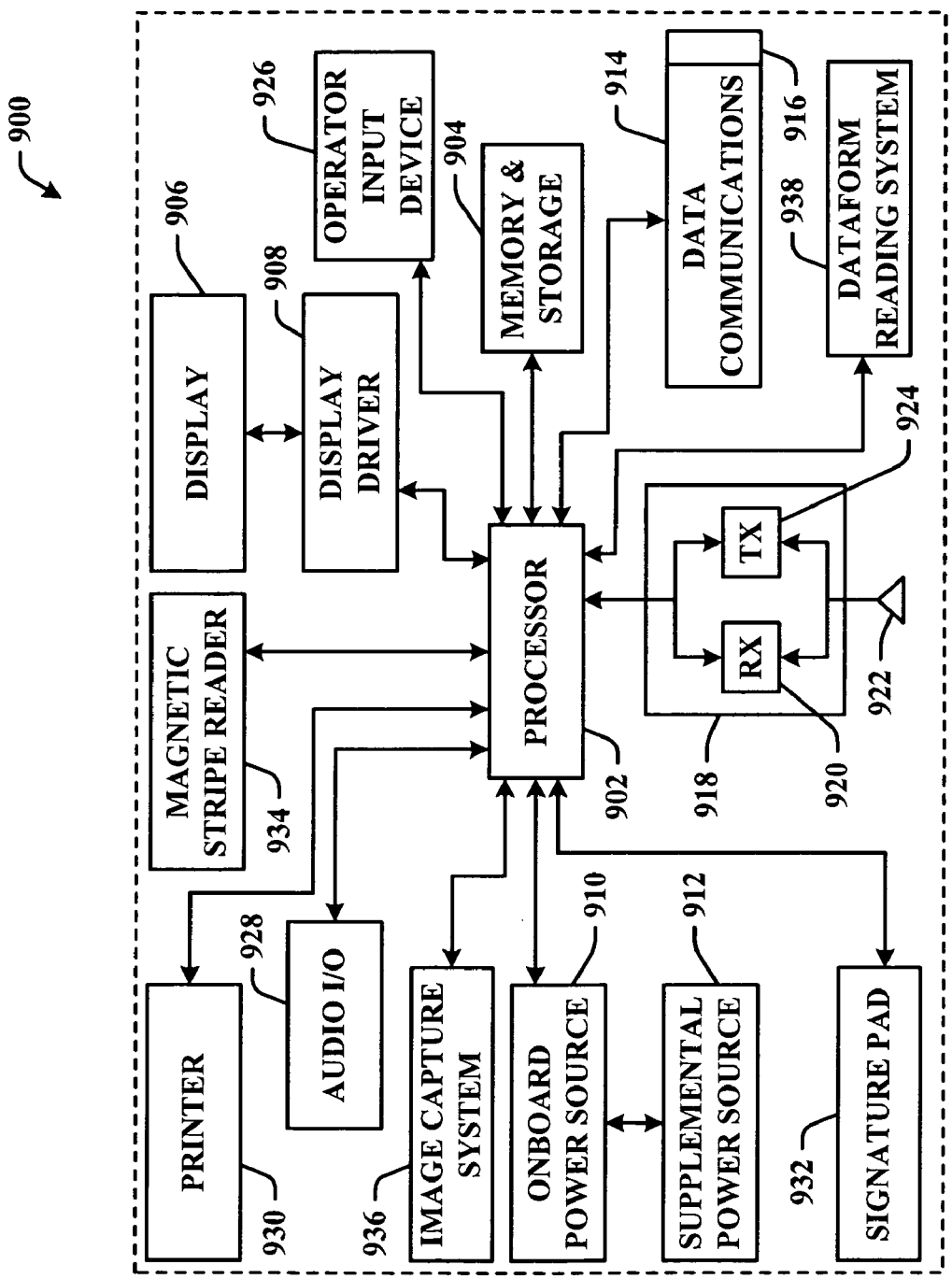
FIG. 9 illustrates a schematic block diagram of a computer operable to execute the disclosed systems and/or methods.
Figure 10:
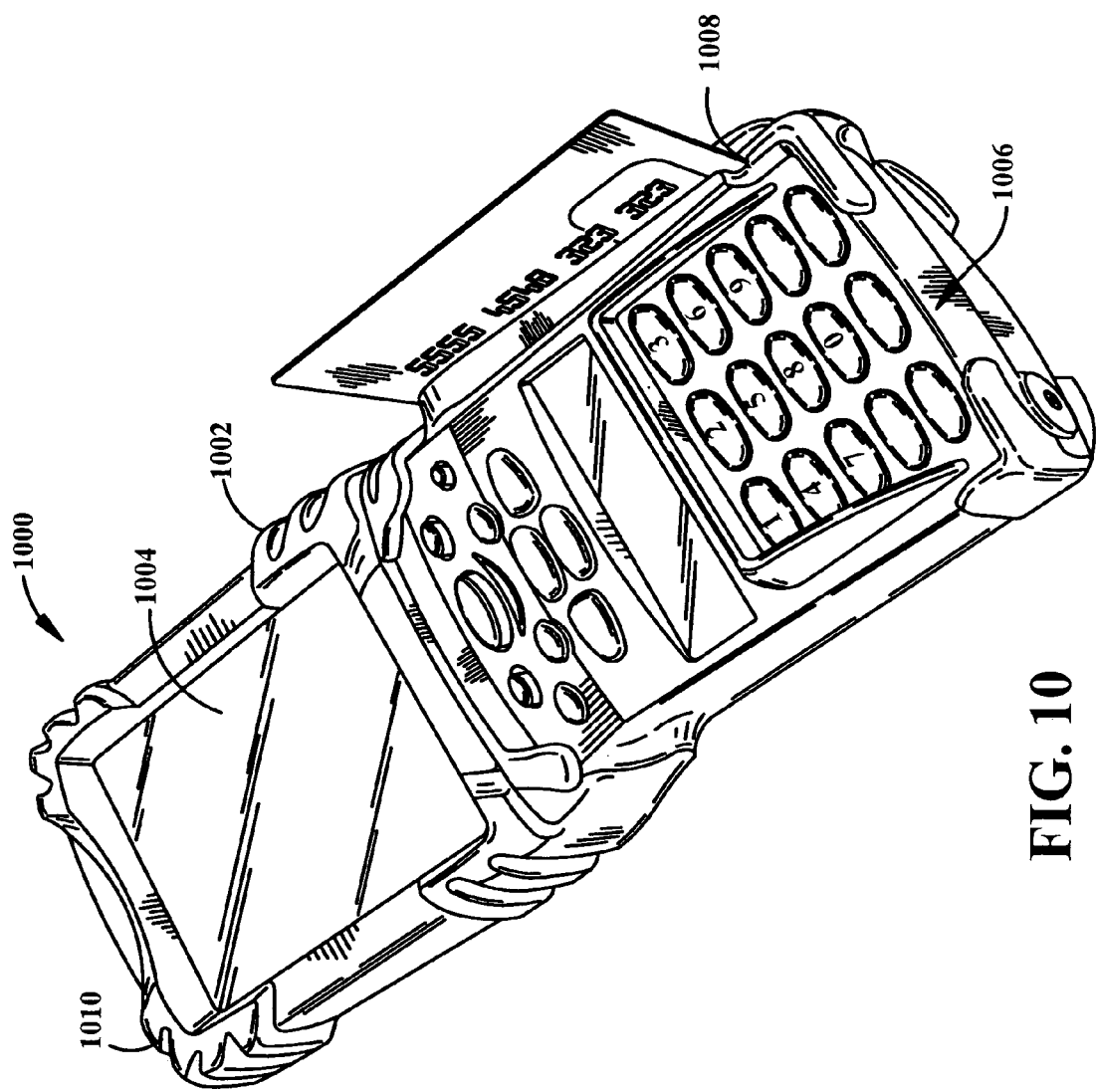
FIG. 10 illustrates an exemplary device operative to execute the systems and/or methods disclosed herein.

Referring now to FIG. 9, illustrated is a schematic block diagram of a portable and/or mobile hand-held terminal device 900 (similar to the portable scanning device 1000 as illustrated in FIG. 10) according to one aspect of the invention, in which a processor 902 is responsible for controlling the general operation of the device 900. The processor 902 is programmed to control and operate the various components within the device 900 in order to carry out the various functions described herein. The processor 902 can be any of a plurality of suitable processors. The manner in which the processor 902 can be programmed to carry out the functions relating to the invention will be readily apparent to those having ordinary skill in the art based on the description provided herein.

A memory 904 connected to the processor 902 serves to store program code executed by the processor 902, and serves as a storage means for storing information such as user credential and receipt transaction information and the like. The memory 904 can be a non-volatile memory suitably adapted to store at least a complete set of the information that is displayed. Thus, the memory 904 can include a RAM or flash memory for high-speed access by the processor 902 and/or a mass storage memory, e.g., a micro drive capable of storing gigabytes of data that comprises text, images, audio, and video content. According to one aspect, the memory 904 has sufficient storage capacity to store multiple sets of information, and the processor 902 could include a program for alternating or cycling between various sets of display information.

A display 906 is coupled to the processor 902 via a display driver system 908. The display 906 can be a color liquid crystal display (LCD), plasma display, or the like. In this example, the display 906 is a ¼ VGA display with sixteen levels of gray scale. The display 906 functions to present data, graphics, or other information content. For example, the display 906 can display a set of customer information, which is displayed to the operator and can be transmitted over a system backbone (not shown). Additionally, the display 906 can display a variety of functions that control the execution of the device 900. The display 906 is capable of displaying both alphanumeric and graphical characters.

Power is provided to the processor 902 and other components forming the hand-held device 900 by an onboard power system 910 (e.g., a battery pack). In the event that the power system 910 fails or becomes disconnected from the device 900, a supplemental power source 912 can be employed to provide power to the processor 902 and to charge the onboard power system 910. The processor 902 of the device 900 induces a sleep mode to reduce the current draw upon detection of an anticipated power failure.

The terminal 900 includes a communication subsystem 914 that includes a data communication port 916, which is employed to interface the processor 802 with a remote computer. The port 916 can include at least one of Universal Serial Bus (USB) and IEEE 1394 serial communications capabilities. Other technologies can also be included, for example, infrared communication utilizing an infrared data port.

The device 900 can also include a radio frequency (RF) transceiver section 918 in operative communication with the processor 902. The RF section 918 includes an RF receiver 920, which receives RF signals from a remote device via an antenna 922 and demodulates the signal to obtain digital information modulated therein. The RF section 918 also includes an RF transmitter 924 for transmitting information to a remote device, for example, in response to manual user input via a user input device 926 (e.g., a keypad) or automatically in response to the completion of a transaction or other predetermined and programmed criteria. The transceiver section 918 facilitates communication with a transponder system, for example, either passive or active, that is in use with product or item RF tags. The processor 902 signals (or pulses) the remote transponder system via the transceiver 918, and detects the return signal in order to read the contents of the tag memory. In one implementation, the RF section 818 further facilitates telephone communications using the device 900. In furtherance thereof, an audio I/O section 928 is provided as controlled by the processor 902 to process voice input from a microphone (or similar audio input device) and audio output signals (from a speaker or similar audio output device). In another implementation, the device 900 can provide voice recognition capabilities such that when the device 900 is used simply as a voice recorder, the processor 902 can facilitate high-speed conversion of the voice signals into text content for local editing and review, and/or later download to a remote system, such as a computer word processor. Similarly, the converted voice signals can be used to control the device 900 instead of using manual entry via the keypad 926.

Onboard peripheral devices, such as a printer 930, signature pad 932, and a magnetic strip reader 934 can also be provided within the housing of the device 900 or accommodated externally through one or more of the external port interfaces 916.

The device 900 can also include an image capture system 936 such that the user can record images and/or short movies for storage by the device 900 and presentation by the display 906. Additionally, a dataform reading system 938 is included for scanning dataforms. It is to be appreciated that these imaging systems (936 and 938) can be a single system capable of performing both functions.

FIG. 10 is provided to assist in understanding and to provide context to an embodiment of the invention. Specifically, FIG. 10 illustrates an example of a handheld terminal 1000 operative to execute the systems and/or methods disclosed herein.

The handheld terminal 1000 includes a housing 1002 which can be constructed from a high strength plastic, metal, or any other suitable material. The handheld terminal 1000 includes a display 1004. As is conventional, the display 1004 functions to display data or other information relating to ordinary operation of the handheld terminal 1000 and/or mobile companion (not shown). For example, software operating on the handheld terminal 1000 and/or mobile companion can provide for the display of various information requested by the user. Additionally, the display 1004 can display a variety of functions that are executable by the handheld terminal 1000 and/or one or more mobile companions. The display 1004 provides for graphics based alphanumerical information such as, for example, the price of an item requested by the user. The display 1004 also provides for the display of graphics such as icons representative of particular menu items, for example. The display 1004 can also be a touch screen, which can employ capacitive, resistive touch, infrared, surface acoustic wave, or grounded acoustic wave technology.

The handheld terminal 1000 further includes user input keys 1006 for allowing a user to input information and/or operational commands. The user input keys 1006 can include a full alphanumeric keypad, function keys, enter keys, etc. The handheld terminal 1000 can also include a magnetic strip reader 1008 or other data capture mechanism (not shown). An electronic signature apparatus can also be employed in connection with the magnetic strip reader or a telecheck system.

The handheld terminal 1000 can also include a window 1010 in which a bar code reader/bar coding imager is able to read a bar code label, or the like, presented to the handheld terminal 1000. The handheld terminal 1000 can include a light emitting diode (LED) (not shown) that is illuminated to reflect whether the bar code has been properly or improperly read. Alternatively, or additionally, a sound can be emitted from a speaker (not shown) to alert the user that the bar code has been successfully imaged and decoded. The handheld terminal 1000 also includes an antenna (not shown) for wireless communication with a radio frequency (RF) access point; and an infrared (IR) transceiver (not shown) for communication with an IR access point.

Figure 11:
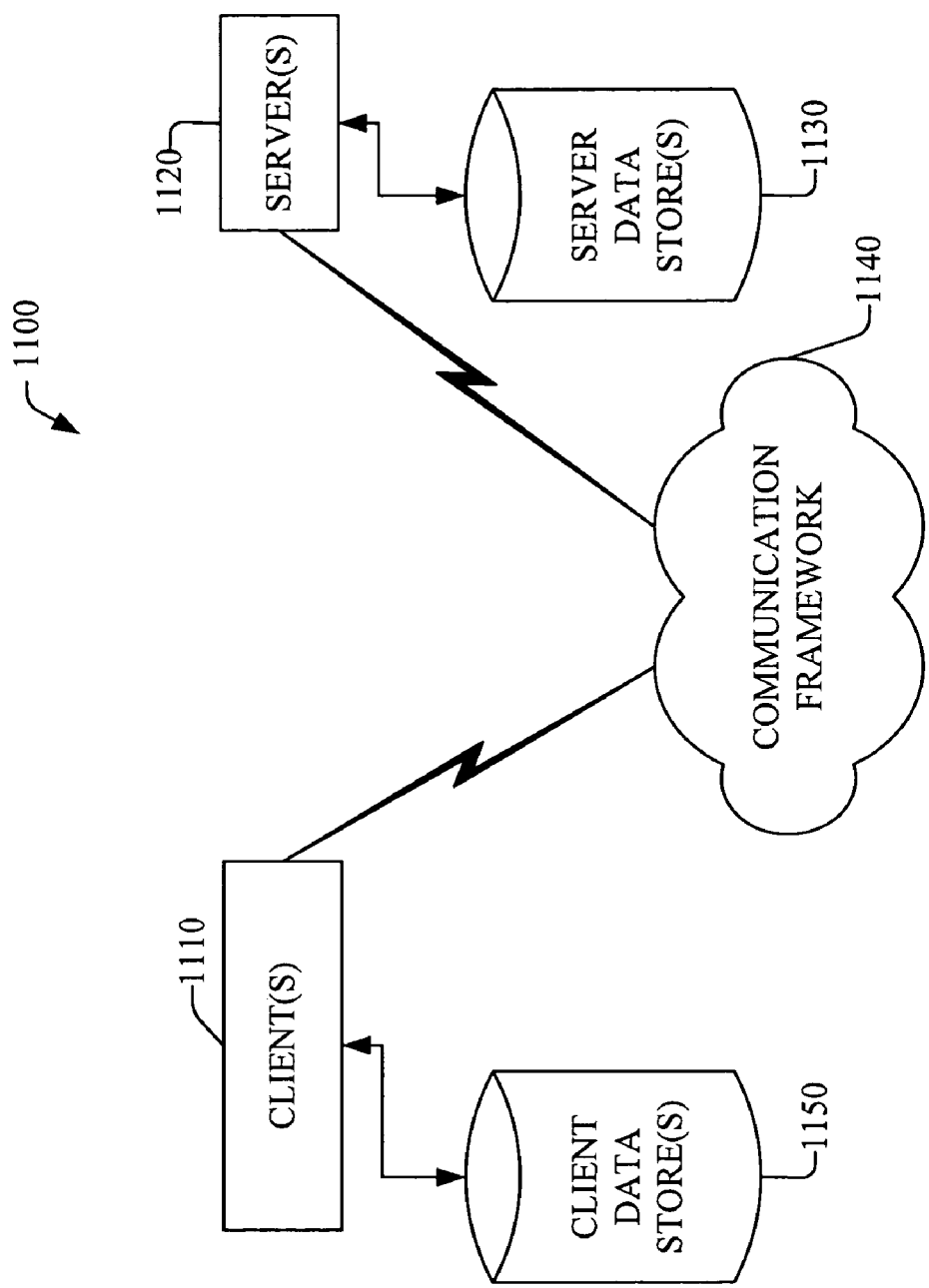
FIG. 11 illustrates an exemplary networking environment that can be employed in connection with the invention.

FIG. 11 is a schematic block diagram of a sample-computing environment 1100 with which the invention can interact. The system 1100 includes one or more client(s) 1110. The client(s) 1110 can be hardware and/or software (e.g., threads, processes, computing devices). The system 1100 also includes one or more server(s) 1120. The server(s) 1120 can also be hardware and/or software (e.g., threads, processes, computing devices). The servers 1120 can house threads to perform transformations by employing the invention, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1140.

Figure 12:
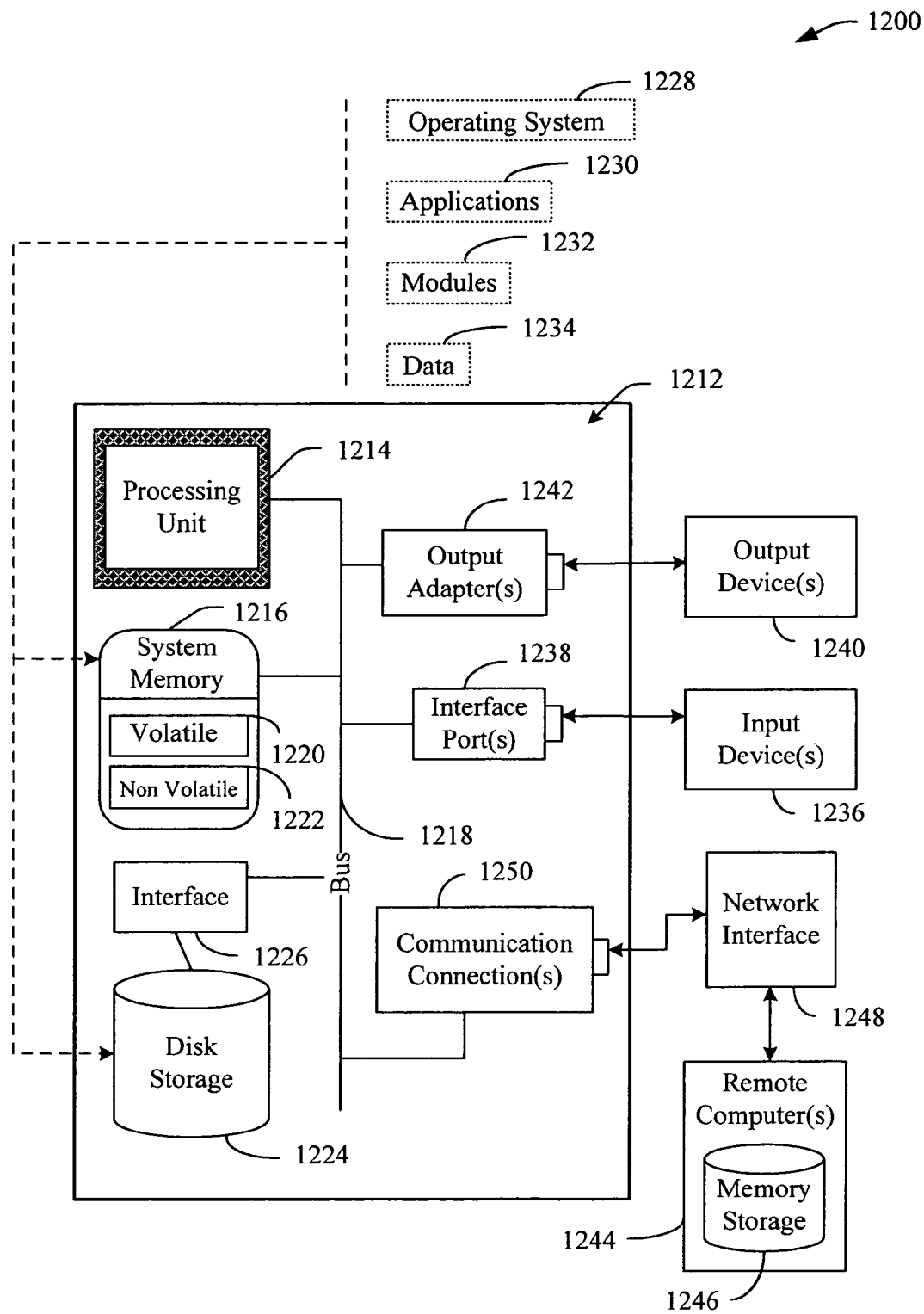
FIG. 12 illustrates an exemplary operating environment that can be employed in connection with the invention.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A portable communication device comprising:
    a data analysis component that monitors stimuli associated with a device;
    a mobility policy manager (MPM) component that provides balancing of network connectivity and power consumption based at least in part upon the monitored stimuli, the MPM component comprising a policy module that determines a policy based at least in part on the monitored stimuli, wherein the policy allows physical network adapters that allow multiple power settings internally to be balanced as multiple separate logical adapters;
    a plurality of network adapters and associated communication protocol to facilitate communication between the device and external devices connected thereto; and
    an override module that provides input to the MPM to alter the policy to select a network adapter from the plurality of network adapters, the selection based upon power consumption and network connection requirements.

2. The portable communication device of claim 1, the data analysis component monitors at least one of network traffic, an internet protocol address, and a port number.

3. The portable communication device of claim 1, the MPM component comprising an alter module that alters at least one policy to provide an optimal device power consumption.

4. The portable communication device of claim 3, the MPM component further comprising a tolerance parameter module that ensures the policy remains within a predetermined power consumption range.

5. The portable communication device of claim 1, the MPM component comprising a hysteresis module that prevents excessive altering between multiple device states.

6. The portable communication device of claim 1, the MPM component comprising a persistence module that allows the device to remain in a non-optimal state during a communication.

7. The portable communication device of claim 6, the non-optimal state is maintained until completion of the communication.

8. The portable communication device of claim 1, the MPM component comprising a packet route management module that controls a connectivity of a first network adapter and at least a second network adapter that are powered at a substantially similar time.

9. The portable communication device of claim 1, the MPM component comprising a designate module that designates at least one connection.

10. The portable communication device of claim 9, the designate module overrides a connection to force one of an outcome and a route.

11. The portable communication device of claim 1, the MPM component comprising a route module that hinders traffic in the absence of an appropriate route.

12. The portable communication device of claim 11, the route module comprising a categorization module that categorizes connections that distinguishes between requirements to create a new route and preference of an existing route.

13. The portable communication device of claim 11, the route module comprising a firewall module that restricts traffic if an appropriate route is not available.

14. A communication architecture, comprising:
a network that includes a plurality of resources;
a data analysis component that captures data about the plurality of resources;
a mobility policy manager (MPM) component that determines a policy to obtain efficient network connectivity and power consumption based at least in part on the captured data, wherein the policy allows physical network adapters that allow multiple power settings internally to be balanced as multiple separate logical adapters;
a plurality of network adapters and associated communication protocol to facilitate communication between a portable communication device and external devices connected thereto; and
an override module that provides input to the MPM to alter the policy to select an adapter from the plurality of network adapters to facilitate communication to at least one external device, the selection based upon power consumption and network connection requirements.

15. The communication architecture of claim 14, the captured data comprising at least one statistic based on network traffic associated with an Internet Protocol address or a port number end point.

16. The communication architecture of claim 14, the MPM component dynamically alters a predefined policy based at least in part upon the captured data.

17. A method for dynamically managing network connection performance, comprising:
creating an initial policy that allows physical network adapters that allow multiple power settings internally to be balanced as multiple separate logical adapters;
monitoring the initial policy;
automatically altering the initial policy to achieve at least one policy objective, altering the initial policy includes selecting from a plurality of network adapters and associated communications protocol; and
employing a network adapter facilitating communication between devices based upon power consumption and the communication protocol required to service the network connection.

18. The method of claim 17, the initial policy is created based upon at least one statistic derived from device conditions.

19. The method of claim 17, automatically altering the initial policy further comprising:
determining a state of a connection;
ascertaining if the connection is complete; and
maintaining the connection state until communication is complete.

20. The method of claim 17, automatically altering the initial policy further includes one of allowing, denying, and rejecting traffic.

21. An article comprising a machine-readable medium storing machine-executable instructions that, when executed, cause a machine to perform operations comprising:
monitor device conditions;
dynamically alter a portable device policy of a portable device to achieve at least one policy objective, the policy allowing physical network adapters that allow multiple power settings internally to be balanced as multiple separate logical adapters; and
provide input to a mobility policy manager of the mobile device configured to alter the policy to select a network adapter from a plurality of network adapters located on the portable device, each network adapter having a unique communication protocol, the selection based upon power consumption and network connection requirements.

22. The article of claim 21 including instructions, that when applied to the machine, cause the machine to balance network connectivity and power consumption based at least in part on the monitored device conditions.

23. The article of claim 21 including instructions, that when applied to the machine, cause the machine to create an initial policy based at least in part on the monitored device conditions.

24. A portable communication system, comprising:
means for monitoring device connectivity and power consumption;
means for creating a policy based at least in part in the monitored device connectivity and power consumption, wherein the policy allows physical network adapters that allow multiple power settings internally to be balanced as multiple separate logical adapters;
means for altering the policy based on monitored operating conditions;
means for selecting from a plurality of network adaptors that comprise the portable communication system; and
means for overriding the policy to select from the plurality of network adapters, the selection based upon the network adapter that meets the requirements of power consumption and network connectivity.

* * * * *

UNITED STATES PATENT AND TRADEMARK OFFICE
CERTIFICATE OF CORRECTION

| | | |
|---|---|---|
| PATENT NO. | : 7,650,522 B2 | Page 1 of 1 |
| APPLICATION NO. | : 11/169093 | |
| DATED | : January 19, 2010 | |
| INVENTOR(S) | : Linsley-Hood et al. | |

It is certified that error appears in the above-identified patent and that said Letters Patent is hereby corrected as shown below:

ON THE TITLE PAGE

1. On the Title Page, in Field (56), under "UNDER PUBLICATIONS", in Column 2, line 5, delete "2309http:" and insert -- 2309, http:// --, therefor.

IN THE SPECIFICATION

2. In Column 3, Line 25, delete "connectivity" and insert -- connectivity. -- therefor.

3. In Column 3, Line 38, delete "DESCRIPTION" and insert -- DETAILED DESCRIPTION --, therefor.

Signed and Sealed this
Eleventh Day of October, 2011

David J. Kappos
*Director of the United States Patent and Trademark Office*